United States Patent
Jeanne et al.

(10) Patent No.: US 10,200,789 B2
(45) Date of Patent: Feb. 5, 2019

(54) METHOD FOR CONFIGURING AN AUDIO RENDERING AND/OR ACQUIRING DEVICE, AND CORRESPONDING AUDIO RENDERING AND/OR ACQUIRING DEVICE, SYSTEM, COMPUTER READABLE PROGRAM PRODUCT AND COMPUTER READABLE STORAGE MEDIUM

(71) Applicant: THOMSON LICENSING, Issy les Moulineaux (FR)

(72) Inventors: Ludovic Jeanne, Montreuil sur Ille (FR); Jean-Pierre Bertin, Guemene-Penfao (FR); Anne Peaudouye, La Bouexiere (FR)

(73) Assignee: Interdigital CE Patent Holdings, rue due Colonel Moll (FR)

( * ) Notice: Subject to any disclaimer, the term of this patent is extended or adjusted under 35 U.S.C. 154(b) by 0 days.

(21) Appl. No.: 15/459,458

(22) Filed: Mar. 15, 2017

(65) Prior Publication Data
US 2017/0272860 A1 Sep. 21, 2017

(30) Foreign Application Priority Data

Mar. 15, 2016 (EP) .................................... 16305277

(51) Int. Cl.
*H04R 3/12* (2006.01)
*H04S 7/00* (2006.01)
(Continued)

(52) U.S. Cl.
CPC .............. *H04R 3/12* (2013.01); *H04R 1/406* (2013.01); *H04S 7/30* (2013.01); *H04R 2420/05* (2013.01);
(Continued)

(58) Field of Classification Search
None
See application file for complete search history.

(56) References Cited

U.S. PATENT DOCUMENTS 6,813,281 B1 * 11/2004 Moon .................. H04N 9/8063
348/462
7,792,311 B1 9/2010 Holmgren et al.
(Continued)

FOREIGN PATENT DOCUMENTS

| JP | 2000237294 | 10/2000 |
| WO | WO2006131894 | 12/2006 |
| WO | WO2010122441 | 10/2010 |

OTHER PUBLICATIONS

Anonymous, "CC85xx Family User's Guide EW1.4.2", Document SWRU250M, Texas Instruments, http://www.ti.com, Jun. 2013, pp. 1-135.

*Primary Examiner* — Curtis A Kuntz
*Assistant Examiner* — Qin Zhu
(74) *Attorney, Agent, or Firm* — Jerome G. Schaefer

(57) ABSTRACT

The present principles relate to a method, for configuring an audio rendering and/or acquiring device of a communication system comprising a master device, the audio rendering and/or acquiring device being adapted to use at least one channel of a plurality of audio channels of the master device, the method being performed in the audio rendering and/or acquiring device. According to an embodiment, the method includes obtaining a state of at least one of the audio channels, the state of an audio channel being representative of a current assigning of the audio channel to another audio rendering and/or acquiring device and selecting the at least one audio channel to be used according to its state. The present principles also relate to the corresponding audio
(Continued)

rendering and/or acquiring device, system, computer readable program product and computer readable storage medium.

9 Claims, 6 Drawing Sheets

(51) Int. Cl.
    *H04R 1/40*     (2006.01)
    *H04W 84/20*     (2009.01)
    *H04W 84/12*     (2009.01)

(52) U.S. Cl.
    CPC ......... *H04R 2420/07* (2013.01); *H04W 84/12* (2013.01); *H04W 84/20* (2013.01)

(56) References Cited

U.S. PATENT DOCUMENTS

| | | |
|---|---|---|
| 8,054,987 B2 | 11/2011 | Seydoux |
| 8,842,842 B2 | 9/2014 | Eppolito et al. |
| 2005/0190928 A1* | 9/2005 | Noto ................. H04R 3/12 381/77 |
| 2006/0009985 A1* | 1/2006 | Ko ................. G11B 20/10 704/500 |
| 2006/0255993 A1* | 11/2006 | Miki ................. H04R 3/12 341/143 |
| 2007/0038999 A1* | 2/2007 | Millington ........... H04J 3/0664 718/100 |
| 2007/0211907 A1* | 9/2007 | Eo ................. H04R 5/04 381/79 |
| 2008/0077261 A1* | 3/2008 | Baudino ............. H04H 20/63 700/94 |
| 2009/0169030 A1* | 7/2009 | Inohara ............. H04R 5/04 381/80 |
| 2009/0197539 A1* | 8/2009 | Shiba ............... H04W 72/085 455/67.11 |
| 2012/0278721 A1* | 11/2012 | Beidel .............. G06Q 50/00 715/733 |
| 2013/0216072 A1* | 8/2013 | Freeman ............ G06F 3/167 381/303 |
| 2013/0324031 A1 | 12/2013 | Loureiro |
| 2014/0169569 A1* | 6/2014 | Toivanen ........... H04R 5/04 381/17 |
| 2014/0256260 A1 | 9/2014 | Ueda et al. |
| 2014/0362995 A1* | 12/2014 | Backman ........... H04S 7/301 381/17 |
| 2015/0208188 A1 | 7/2015 | Carlsson et al. |

* cited by examiner

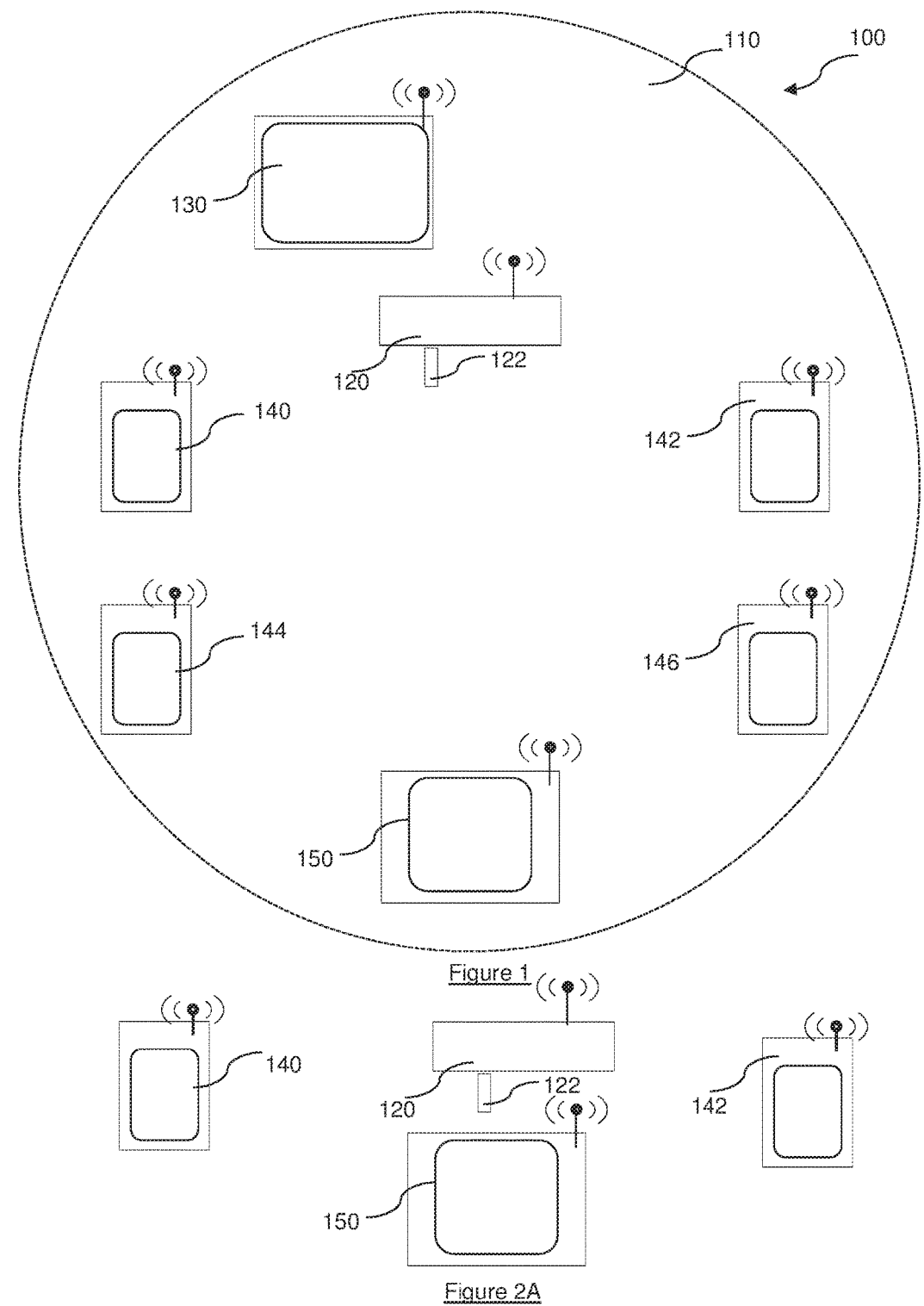

METHOD FOR CONFIGURING AN AUDIO RENDERING AND/OR ACQUIRING DEVICE, AND CORRESPONDING AUDIO RENDERING AND/OR ACQUIRING DEVICE, SYSTEM, COMPUTER READABLE PROGRAM PRODUCT AND COMPUTER READABLE STORAGE MEDIUM

1. REFERENCE TO RELATED EUROPEAN APPLICATION

This application claims the benefit, under 35 U.S.C. § 365 of European Patent Application No. 16305277.2, filed 15 Mar. 2016, entitled "METHOD FOR CONFIGURING AN AUDIO RENDERING AND/OR ACQUIRING DEVICE, AND CORRESPONDING AUDIO RENDERING AND/OR ACQUIRING DEVICE, SYSTEM, COMPUTER READABLE PROGRAM PRODUCT AND COMPUTER READABLE STORAGE MEDIUM", the contents of which are hereby incorporated by reference in its entirety.

2. TECHNICAL FIELD

The present disclosure relates to the field of audio acquiring and/or rendering in a distributed system including at least one wireless audio rendering and/or acquiring device.

A method for configuring an audio rendering and/or acquiring device, and corresponding audio rendering and/or acquiring device, system, computer readable program product and computer readable storage medium are described.

3. BACKGROUND ART

Wireless communication end-devices, for instance set-top-box (STB), smartphones, tablets, personal computers (PC) or peripherals like printers, speakers (or audio renderers), microphone have become widely used nowadays. They can exchange data with other wireless communication devices inside a wireless network, for instance a wireless local area network (WLAN) thanks to wireless communication interfaces, like WI-FI® or Bluetooth® interfaces. More and more LAN services, notably WLAN services, are deployed in a home environment and used or day-to-day life. The use of wireless devices in a network avoid the need, for a user, of cabling, or physically interconnecting devices. However, configuration can still be necessary. Notably, a system (like a wireless audio and/or video system of a home network) comprising several wireless devices can have multiple configurations. For instance, in the field of audio transmission, wireless technology allows high-end digital transmission of multiple audio channels from a multimedia device to several wireless renderers. However, multiple configuration of the devices are possible, depending upon the number and the king of devices present in the system, their spatial location.

Thus, there a need for a user to be able to define simply the chosen configuration. Some solutions of the state of the art have tried to provide a user with an automatic set up of the configuration of its wireless devices. For instance, document WO2006131894 A2 proposes to configure audio devices according to their location.

4. SUMMARY

The present principles enable at least one of the above disadvantages to be resolved by proposing a method, for configuring at least partially an audio rendering and/or acquiring device of a communication system comprising a master device, said audio rendering and/or acquiring device being adapted to use at least one channel of a plurality of audio channels of said master device, said method being performed in said audio rendering and/or acquiring device.

According to an embodiment of the present disclosure, the present disclosure concerns a method, to be performed in an audio rendering and/or acquiring device of a communication system comprising a master device, said method comprising configuring said audio rendering and/or acquiring device to use at least one audio channel of a plurality of audio channels of said master device.

According to an embodiment of the present disclosure, the method comprises:
  obtaining a selection state of each of said audio channels, the selection state of an audio channel being representative of an existing selection of said audio channel by at least another audio rendering and/or acquiring device;
  selecting at least one audio channel to be used by said audio rendering and/or acquiring device, according to its selection state.

According to an embodiment of the present disclosure, the method comprises:
  obtaining a state of at least one of said plurality of audio channels, the state of one of said audio channels being representative of a current assigning of said audio channel to at least another audio rendering and/or acquiring device;
  selecting the at least one audio channel to be used amongst said plurality of audio channels according to the obtained state.

According to an embodiment of the present disclosure, said audio rendering and/or acquiring device is an audio rendering device and said master device output at least on audio signal on said plurality of audio channels.

According to an embodiment of the present disclosure, said audio rendering and/or acquiring device is an audio acquiring device and at least one audio signal is input to said master device by said plurality of audio channels.

According to an embodiment of the present disclosure, said obtaining and said selecting are performed during a pairing between said audio rendering and/or acquiring device and said master device.

According to an embodiment of the present disclosure, said audio channel is selected beyond the audio channels not yet selected by another audio rendering and/or acquiring device.

According to an embodiment of the present disclosure, when all audio channels are already selected by at least another audio rendering and/or acquiring device, said selecting is performed beyond said already selected audio channels.

According to an embodiment of the present disclosure, said audio rendering and/or acquiring device is configurable to use a variable number of audio channels.

According to an embodiment of the present disclosure, said obtaining results in an ordered set of selection states, and said selecting take into account an order of the selection state of said audio channel inside said ordered set.

According to an embodiment of the present disclosure, said communication system comprises a plurality of audio rendering and/or acquiring devices and at least a part of said plurality of audio rendering and/or acquiring devices is sequentially powered on according to the order of said ordered set of selection states.

According to another aspect, the present disclosure relates to an audio rendering and/or acquiring device belonging to a communication system comprising a master device, said audio rendering and/or acquiring device being adapted to use at least one channel of a plurality of audio channels of said master device.

According to an embodiment of the present disclosure, said audio rendering and/or acquiring device comprises at least one processor configured for:
  obtaining a selection state of each of said audio channels, the selection state of an audio channel being representative of an existing selection of said audio channel by at least another audio rendering and/or acquiring device;
  selecting at least one audio channel to be used by said audio rendering and/or acquiring device according to its selection state.

According to an embodiment of the present disclosure, said audio rendering and/or acquiring device belongs to a group comprising:
  a subwoofer comprising a low pass filter;
  a satellite speaker configurable in a high pass filter mode and/or in a bass booster mode;
  a microphone.

According to an embodiment of the present disclosure, said audio rendering and/or acquiring device further comprises a pairing button, said pairing button being adapted to configure said audio rendering and/or acquiring device to use a variable number of audio channels.

While not explicitly described, the audio rendering and/or acquiring device of the present disclosure can be adapted to perform the method of the present disclosure in any of its embodiments.

The present disclosure notably relates to an audio rendering and/or acquiring device belonging to a communication system comprising a master device, said audio rendering and/or acquiring device being adapted to be configured to use at least one audio channel of a plurality of audio channels of said master device.

According to an embodiment of the present disclosure, said audio rendering and/or acquiring device being comprising at least one processor configured for:
  obtaining a state of at least one of said plurality of audio channels, the state of an audio channel being representative of a current assigning of said audio channel to at least another audio rendering and/or acquiring device;
  selecting the at least one audio channel to be used amongst said plurality of audio channels according to according to the obtained state.

According to an embodiment of the present disclosure, said audio channels are wireless audio channels.

According to an embodiment of the present disclosure, said audio rendering and/or acquiring device is an audio rendering device and said master device outputs at least on audio signal on said plurality of audio channels.

According to an embodiment of the present disclosure, said audio rendering and/or acquiring device is an audio acquiring device and at least one audio signal is input to said master device by said plurality of audio channels.

According to an embodiment of the present disclosure, said obtaining and said selecting are performed during a pairing between said audio rendering and/or acquiring device and said master device.

According to an embodiment of the present disclosure, said audio channel to be used is selected beyond the audio channels not yet assigned to another audio rendering and/or acquiring device.

According to an embodiment of the present disclosure, when all audio channels are already assigned to at least another audio rendering and/or acquiring device, said selecting is performed beyond said already assigned audio channels.

According to an embodiment of the present disclosure, said audio rendering and/or acquiring device is configurable to use a variable number of audio channels.

According to another aspect, the present disclosure relates to an audio rendering and/or acquiring device belonging to a communication system comprising a master device, said audio rendering and/or acquiring device being adapted to use at least one channel of a plurality of audio channels of said master device.

According to an embodiment of the present disclosure, said audio renderering and/or acquiring device comprises at least one memory and at least one processing circuitry configured to perform:
  obtaining a selection state of each of said audio channels, the selection state of an audio channel being representative of an existing selection of said audio channel by at least another audio rendering and/or acquiring device;
  selecting at least one audio channel to be used by said audio rendering and/or acquiring device according to its selection state.

While not explicitly described, the audio rendering and/or acquiring device of the present disclosure can be adapted to perform the method of the present disclosure in any of its embodiments.

According to another aspect, the present disclosure relates to a communication system, comprising a least one master device and at least one audio rendering and/or acquiring device linked together by a communication network, said audio rendering and/or acquiring device being adapted to use at least one channel of a plurality of audio channels of said master device.

According to an embodiment of the present disclosure, said audio rendering and/or acquiring device comprises at least one processor configured for:
  obtaining a selection state of each of said audio channels, the selection state of an audio channel being representative of an existing selection of said audio channel by at least another audio rendering and/or acquiring device;
  selecting at least one audio channel to be used by said audio rendering and/or acquiring device according to its selection state.
  The present disclosure also relates to a communication system, comprising a least one master device and at least one audio rendering and/or acquiring device linked together by a communication network, said audio rendering and/or acquiring device being adapted to be configured to use at least one channel of a plurality of audio channels of said master device.

According to an embodiment of the present disclosure, wherein said audio rendering and/or acquiring device comprises at least one processor configured for:
  obtaining a state of at least one of said plurality of audio channels, the state of one of said audio channels being representative of a current assigning of said audio channel to at least another audio rendering and/or acquiring device;
  selecting the at least one audio channel to be used amongst said plurality of audio channels according to the obtained state.

According to an embodiment of the present disclosure, said obtaining results are in an ordered set of states, and said selecting takes into account an order of the state of said audio channel inside said ordered set.

According to an embodiment of the present disclosure, said communication system comprises a plurality of audio rendering and/or acquiring devices and at least a part of said plurality of audio rendering and/or acquiring devices is sequentially powered on according to the order of said ordered set of states.

While not explicitly described, the present embodiments related to the method or to the corresponding audio rendering and/or acquiring device or system of the present disclosure can be employed in any combination or sub-combination. For example, according to some embodiments of the method of the present disclosure, said audio rendering and/or acquiring device is an audio rendering device, said master device output at least on audio signal on said plurality of audio channels, said obtaining and said selecting are performed during a pairing between said audio rendering and/or acquiring device and said master device, said obtaining results in an ordered set of selection states, and said selecting take into account an order of the selection state of said audio channel inside said ordered set.

According to another aspect, the present disclosure relates to a non-transitory program storage device, readable by a computer.

According to an embodiment of the present disclosure, said non-transitory computer readable program storage device tangibly embodies a program of instructions executable by a computer to perform the method of the present disclosure in any of its embodiments.

Notably, the present disclosure relates to a non-transitory computer readable program storage device tangibly embodying a program of instructions executable by the computer to perform a method for configuring at least partially an audio rendering and/or acquiring device of a communication system comprising a master device, said audio rendering and/or acquiring device being adapted to use at least one channel of a plurality of audio channels of said master device, said method being performed in said audio rendering and/or acquiring device.

According to an embodiment of the present disclosure, said method comprises:
    obtaining a selection state of each of said audio channels, the selection state of an audio channel being representative of an existing selection of said audio channel by at least another audio rendering and/or acquiring device;
    selecting at least one audio channel to be used by said audio rendering and/or acquiring device, according to its selection state.

The present disclosure also relates to a non-transitory computer readable program storage device tangibly embodying a program of instructions executable by the computer to perform a method for configuring at least partially an audio rendering and/or acquiring device of a communication system comprising a master device, said audio rendering and/or acquiring device being adapted to use at least one channel of a plurality of audio channels of said master device, said method being performed in said audio rendering and/or acquiring device, wherein said method comprises
    obtaining a state of at least one of said plurality of audio channels, the state of one of said audio channels being representative of a current assigning of said audio channel to at least another audio rendering and/or acquiring device;
    selecting the at least one audio channel to be used amongst said plurality of audio channels according to the obtained state.

According to another aspect, the present disclosure relates to a non-transitory computer readable program product.

According to an embodiment of the present disclosure, said non-transitory computer readable program product tangibly embodies a program of instructions executable by a computer to perform the method of the present disclosure in any of its embodiments.

Notably, in some embodiments, said comprises program code instructions for performing, when said non-transitory software program is executed by a computer, a method for configuring at least partially an audio rendering and/or acquiring device of a communication system comprising a master device, said audio rendering and/or acquiring device being adapted to use at least one channel of a plurality of audio channels of said master device, said method being performed in said audio rendering and/or acquiring device and comprising:
    obtaining a selection state of each of said audio channels, the selection state of an audio channel being representative of an existing selection of said audio channel by at least another audio rendering and/or acquiring device;
    selecting at least one audio channel to be used by said audio rendering and/or acquiring device, according to its selection state.

Also, in some embodiments, said comprises program code instructions for performing, when said non-transitory software program is executed by a computer, a method, to be performed in an audio rendering and/or acquiring device of a communication system comprising a master device, said method comprising configuring said audio rendering and/or acquiring device to use at least one audio channel of a plurality of audio channels of said master device, said method comprising:
    obtaining a state of at least one of said plurality of audio channels, the state of one of said audio channels being representative of a current assigning of said audio channel to at least another audio rendering and/or acquiring device;
    selecting the at least one audio channel to be used amongst said plurality of audio channels according to the obtained state.

According to another aspect, the present disclosure relates to a computer readable storage medium carrying a software program.

According to an embodiment of the present disclosure, said software program comprises program code instructions for performing the method of the present disclosure, in any of its embodiments, when said non transitory software program is executed by a computer.

According to an embodiment of the present disclosure, said software program comprises program code instructions for performing, when said non-transitory software program is executed by a computer, a method for configuring at least partially an audio rendering and/or acquiring device of a communication system comprising a master device, said audio rendering and/or acquiring device being adapted to use at least one channel of a plurality of audio channels of said master device, said method being performed in said audio rendering and/or acquiring device and comprising obtaining a selection state of each of said audio channels, the selection state of an audio channel being representative of an existing selection of said audio channel by at least another audio rendering and/or acquiring device;

selecting at least one audio channel to be used by said audio rendering and/or acquiring device, according to its selection state.

According to an embodiment of the present disclosure, said comprises program code instructions for performing, when said non-transitory software program is executed by a computer, a instructions for performing, when said non-transitory software program is executed by a computer, a method, to be performed in an audio rendering and/or acquiring device of a communication system comprising a master device, said method comprising configuring said audio rendering and/or acquiring device to use at least one audio channel of a plurality of audio channels of said master device, said method comprising:

obtaining a state of at least one of said plurality of audio channels, the state of one of said audio channels being representative of a current assigning of said audio channel to at least another audio rendering and/or acquiring device;

selecting the at least one audio channel to be used amongst said plurality of audio channels according to the obtained state.

4. LIST OF DRAWINGS

The present disclosure will be better understood, and other specific features and advantages will emerge upon reading the following description, the description making reference to the annexed drawings wherein:

FIG. 1 shows an example of a wireless communication system according to a particular embodiment of the present disclosure;

FIG. 2A illustrates a particular configuration of the wireless communication system of FIG. 1, where only two audio speakers are present and enabled and where the subwoofer is absent or disabled;

Figure 2B:
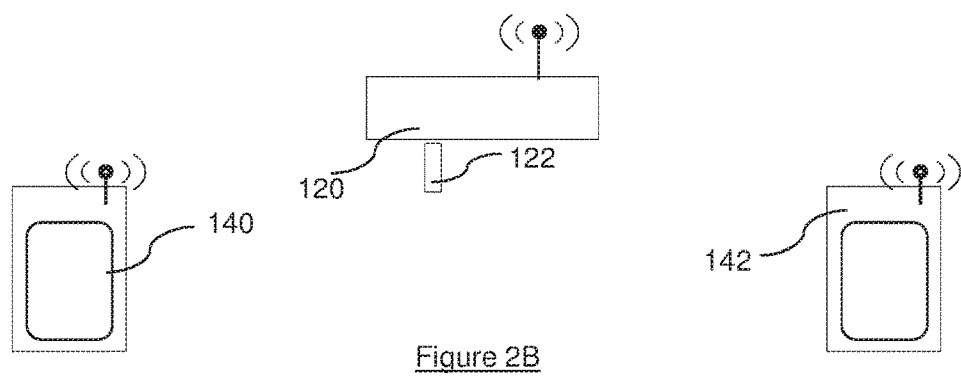
FIG. 2B illustrates another configuration of the wireless communication system of FIG. 1, where only two audio speakers are present and enabled and where the subwoofer is absent or disabled.

It is to be noted that the drawings have only an illustration purpose and that the embodiments of the present disclosure are not limited to the illustrated embodiments.

5. DETAILED DESCRIPTION OF THE EMBODIMENTS

At least one embodiment of the present disclosure can offer a new way of setting up a configuration of at least one wireless audio rendering and/or acquiring device (like an audio renderer or a microphone) of a wireless system comprising a master device (for instance a STB, a TV, a tablet, a smartphone or a PC), acting as a routing device, and belonging to a communication network (like a local area network).

Indeed, at least some embodiments of the present disclosure can permit to have an at least partially automatic setup of the audio rendering and/or acquiring device (called hereinafter "slave device") while reducing the complexity and/or the cost of the device. This can be achieved thanks to an at least partially automatic paring of speakers or microphones with the audio channels of the master device.

More precisely, the slave devices can be powered on and paired with the master device in a specified order. A slave device can discover the audio capabilities of the master and the available audio channels (that is to say the audio channels input to the master device that can thus be transmitted for a renderer or the audio channels that can be received by a master for a microphone). From the discovered information, the slave device can select automatically the channels that it will use (that is to say the channels that a slave renderer will consume or the channels a slave microphone will produce).

At least one embodiment of the present disclosure can thus permit to suppress, or at least partially avoid, the need of dedicated user switches on the speakers or microphones or an implementation of a complicated method in a firmware of a slave.

At least some embodiments of the present disclosure can be adapted to a configuration of a wireless system comprising a variable number of devices.

Moreover, in at least some embodiments, a single firmware of a speaker can be developed, that can be used for different configurations of an audio renderer (thus playing different audio rendering) and embedded in different kinds of renderer devices (like in a satellite speaker and in a subwoofer).

A particular embodiment is described hereinafter in link with audio rendering devices. However, other embodiments of the present disclosure can relate to audio acquiring devices or to a combination of at least one audio rendering device and at least one audio acquiring device.

In the detailed embodiment illustrated in FIG. 1, a wireless audio and/or video system 100 is described.

The system 100 belongs to a communication network 110. The system 100 notably includes a master device 120, acting as the master device of the system 100 and adapted to output at least an audio signal. Depending upon embodiments, the master device can be a Set Top Box, a tablet, a PC, a smartphone, a Blue-ray player, a TV, or any kind of wireless device that can output audio channels. In the illustrated embodiment, this master device is a Set Top Box (STB) 120 which can receive an audiovisual signal (for instance from another communication network, like an internet network) and can output a video component of the audiovisual signal (that will be rendered by a display 130 for instance) and an audio component of the audiovisual signal (that will be rendered by at least one audio renderer 140, 142, 144, 146, 150 of the system 100 for instance). In the particular embodiment of FIG. 1, the STB 120 is equipped with a peripheral device 122, for instance a dongle connected to one of the USB port of the STB (like the product TI CC85xx developed by Texas Instrument®), comprising wireless transmitting means adapted for output the audio channels. The dongle 122 can optionally comprise other wireless receiving means.

The system 100 also includes audio renderers 140, 142, 144, 146, 150. An audio renderer can be either a satellite renderer 140, 142, 144, 146 (working in a high pass filter mode or in a bass booster) or a subwoofer 150, with a low pass filter. At least one of the audio renderers 140, 142, 144, 146, 150 of the system implements the method of the present disclosure. In the illustrated embodiment of FIG. 1, every renderer of the system implements the method of the present disclosure. However, in other embodiments, the method of the present disclosure can be implemented in an audio renderer being part of a system also comprising other audio renderers not implementing the method of the present disclosure, or a different embodiment of the method of the present disclosure.

In the embodiment illustrated, all the devices are wireless devices. Of course, the system can also comprise wired devices or a combination of wireless devices and wired devices. For instance, the display or the subwoofer can be connected by a wired connection to the STB. Notably, the subwoofer can be connected through by a JACK connection to the STB. In such an embodiments, two audio channels used by a wired subwoofer can be assigned manually by a user.

In this illustrated embodiment, the protocol to be used to exchange data between the renderer devices 120 and the master device 100 is a protocol requiring or offering a pairing between devices, for instance a protocol use by the product (or dongle) TI CC85xx developed by Texas Instrument®.

In other embodiments, dedicated buttons of the speaker and the master device can be used to force the exchange of items of information between the devices in order to configure the speaker.

Depending upon embodiments, the renderers can have different acoustic characteristics. In a simplification purpose, in the illustrated embodiment of FIG. 1, all the renderers have the same acoustic characteristics, and the same firmware. Of course, in other embodiments, the system can comprise a heterogeneous set of renderers, with different firmware.

In the system 100, each audio renderer has to play a particular role, depending upon the geographic configuration of the system. Indeed, in order to provide a distributed sound to a user, a satellite speaker can be a "front left" speaker, a "front right" speaker, a "rear left" speaker, a "rear right" speaker. The audio renderers present at a given moment in the system can also vary. For instance, a renderer can be either on or off. An audio renderer can also be added or removed from the system by a user.

FIGS. 2A to 2D illustrate different wireless audio configurations "n.m" of the system 100 (that is to say comprising n satellite speakers and m subwoofers with n, m being integers greater or equal to zero).

In the example illustrated by FIG. 2A, the configuration is of type "2.1". The system 100 comprises the display (herein a TV set) 130, the STB 120, and two mono channel audio speakers 140, 142 (a front left speaker with high pass filter and a front right speaker with high pass filter) and a subwoofer 150 comprising a front left and a front right audio output with a low pass filter. The wireless subwoofer is present and enabled.

In the example illustrated by FIG. 2B, the configuration is of type "2.0". The system comprises the same devices as in the example of FIG. 2A, except that the subwoofer is either absent or disabled.

Figure 2C:
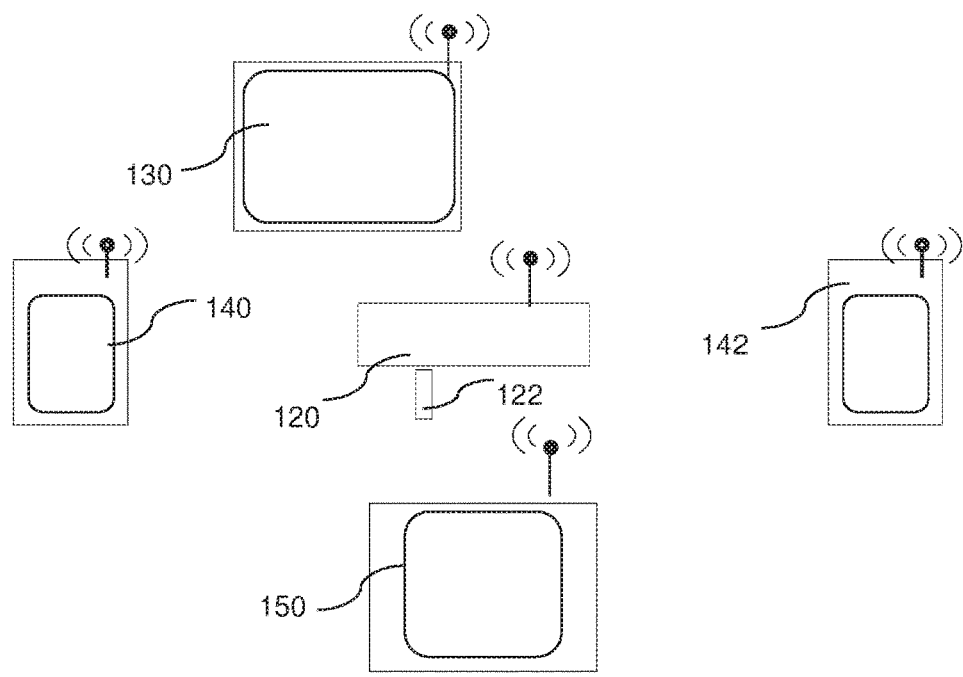
FIG. 2C illustrates still another configuration of the wireless communication system of FIG. 1, where only two audio speakers are present and enabled, the system includes a stereo TV set and the subwoofer is present and enabled.

In the example illustrated by FIG. 2C, the configuration can be of type "4.1". The system channels comprises a stereo channel (Rear Left+Rear Right) with high pass filter) for the TV, the STB, two mono channel audio speakers 140, 142 (a front left with high pass filter and a front right speaker with high pass filter) and a subwoofer 150 comprising a front left and a front right audio output with low pass filter. The wireless subwoofer is present and enabled.

In another example, not illustrated, the system comprises the same devices as in the example of FIG. 2C, except that the subwoofer is either absent or disabled.

Figure 2D:
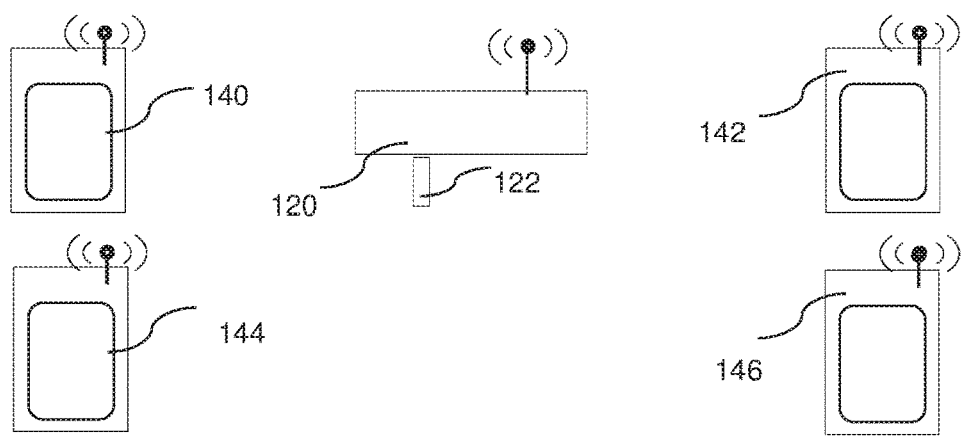
FIG. 2D illustrates still another configuration of the wireless communication system of FIG. 1, where four audio speakers are present and enabled and where the subwoofer is absent or disabled.

In the example illustrated by FIG. 2D, the configuration can be of type "4.0". The system 100 comprises the display (herein a TV set) 130, the STB 120, and four mono channel audio speakers 140, 142, 144, 146 (a front left speaker with a high pass filter, a front right speaker with a high pass filter, a rear left speaker with a high pass filter and a rear right speaker with a high pass filter) no wireless subwoofer is present.

Depending upon embodiments, the number of audio channels consumed by an audio renderer can vary. For instance, in a first audio consumption mode ("mono"), a satellite speaker can consume a unique audio channel. In a second audio consumption mode ("stereo") a satellite speaker can consume two audio channels.

In the detailed embodiment, a satellite speaker can have two types of audio consumption modes (mono and stereo) and can be configured for working in one of the consumption modes by a user. For instance, a "pairing button" of the audio renderer can permit to select an audio consumption mode, according to a duration of a pressure applied to the pairing button. After a short pressure (less than a time threshold, like 4, 5 or 6 seconds), the speaker can consume only one audio channel. After a long pressure (more than the threshold), the speaker can consume two audio channels. In such a case, if the channels are numbered from 0 to 3, the consumed channels can be the channels 0 and 1, or the channels 2 and 3 for having a complete stereo. In some embodiments, some pair of values (like a pair constituted by channel 1 and channel 2) can be forbidden for an audio renderer for simplification purpose and/or for acoustic issue.

A subwoofer can consume one or two audio channels. However, as in the detailed embodiment, a subwoofer can be forced to consume two audio channels, as detailed herein after. In a variant, the subwoofer can be used in a mono audio consumption mode.

Figure 3:
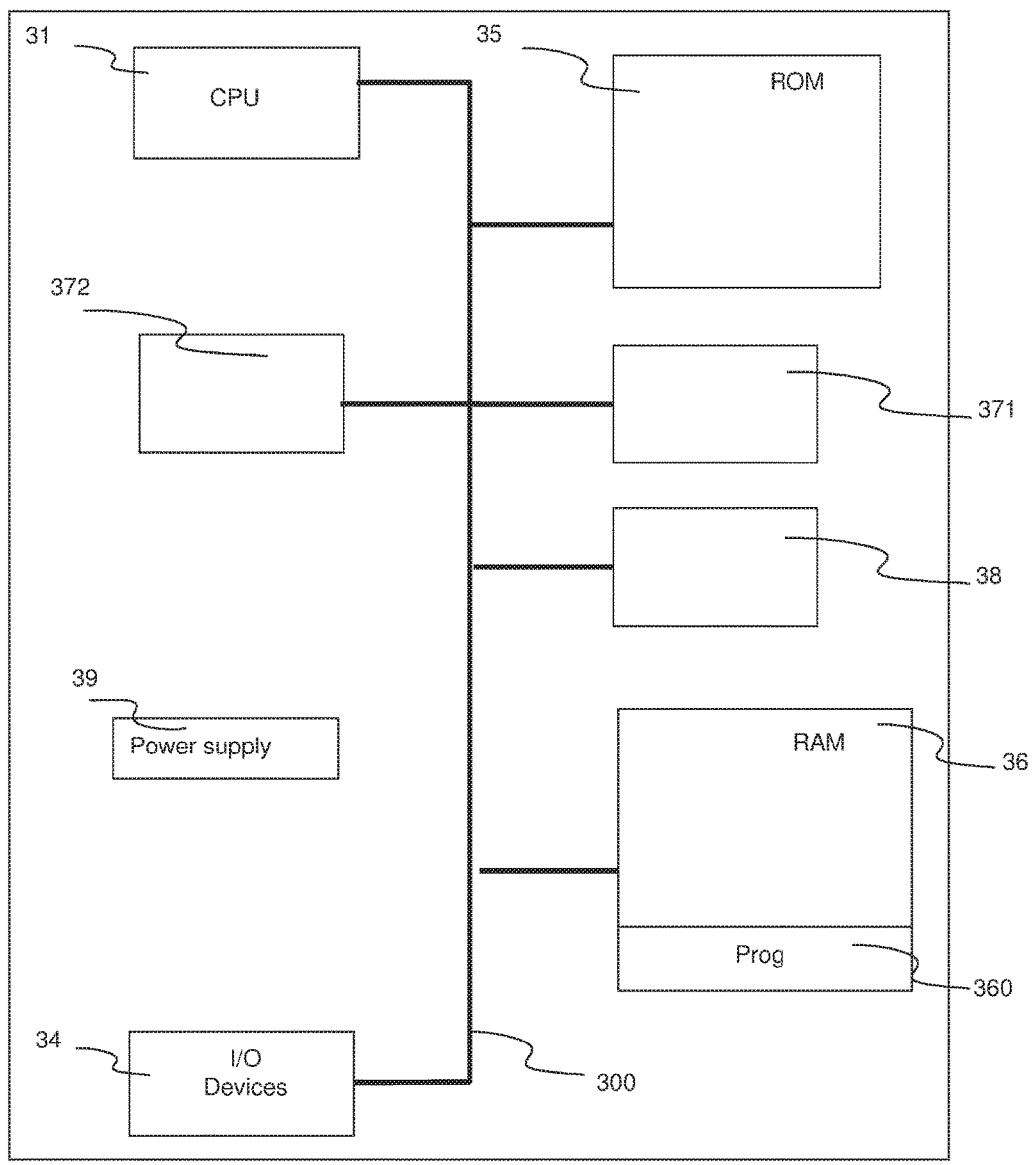
FIG. 3 illustrates the structure of an audio renderer of the wireless communication system of FIG. 1.

FIG. 3 describes the structure of a wireless audio renderer adapted to implement the method 400 of the present disclosure. It can be for instance an audio renderer illustrated by FIG. 1, like a satellite speaker 140, 142, 144, 146 or a subwoofer 150.

In the particular embodiment of FIG. 3, the audio renderer can include different devices, linked together via a data and address bus 300, which can also carry a timer signal. For instance, it can include a micro-processor 31 (or CPU), at least one Input/Output module 34, (like a tactile display, a switch, a led, a button (like a pairing button), and so on), a ROM (or « Read Only Memory ») 35, a RAM (or « Random Access Memory ») 36, communication interfaces 371, 372 configured for the reception and/or transmission of data via a wireless connection, wired communication interfaces 38 (optional), a power supply 39.

In the illustrated embodiment, the audio renderer 140, 142, 144, 146, 150 can communicate with the master device 120 (linked to a display 130 as illustrated by FIG. 1) thanks to a wireless interface. The audio renderer is notably adapted to use at least one channel of a plurality of audio channels of the master device.

Each of the mentioned memories can include at least one register, that is to say a memory zone of low capacity (a few binary data) or high capacity (with a capability of storage of a whole program or of all or part of data representative of data to be calculated or displayed).

When the audio renderer is powered on, the microprocessor 31 loads the program instructions 360 in a register of the RAM 56, notably the processes needed for performing at least one embodiment of the configuring method described herein, and executes the program instructions.

According to a variant, the audio renderer includes several microprocessors. According to another variant, the power supply 39 is external to the audio renderer.

In the particular embodiment illustrated in FIG. 3A, the microprocessor 31 can be configured for:
  obtaining a selection state of each of the audio channels, the selection state of an audio channel being representative of an existing selection of the audio channel by at least another audio rendering and/or acquiring device;
  selecting at least one audio channel to be used by the audio rendering and/or acquiring device according to its selection state.
  In some embodiments, the microprocessor 31 can be configured for:
  obtaining a state of at least one of said plurality of audio channels, the state of an audio channel being representative of a current assigning of said audio channel to at least another audio rendering and/or acquiring device;
  selecting the at least one audio channel to be used amongst said plurality of audio channels according to according to the obtained state.

The audio renderer can notably belong to a communication system further comprising a master device. The system can also comprise at least another audio renderer, as illustrated by FIGS. 1 and 2A to 2D.

Figure 5:
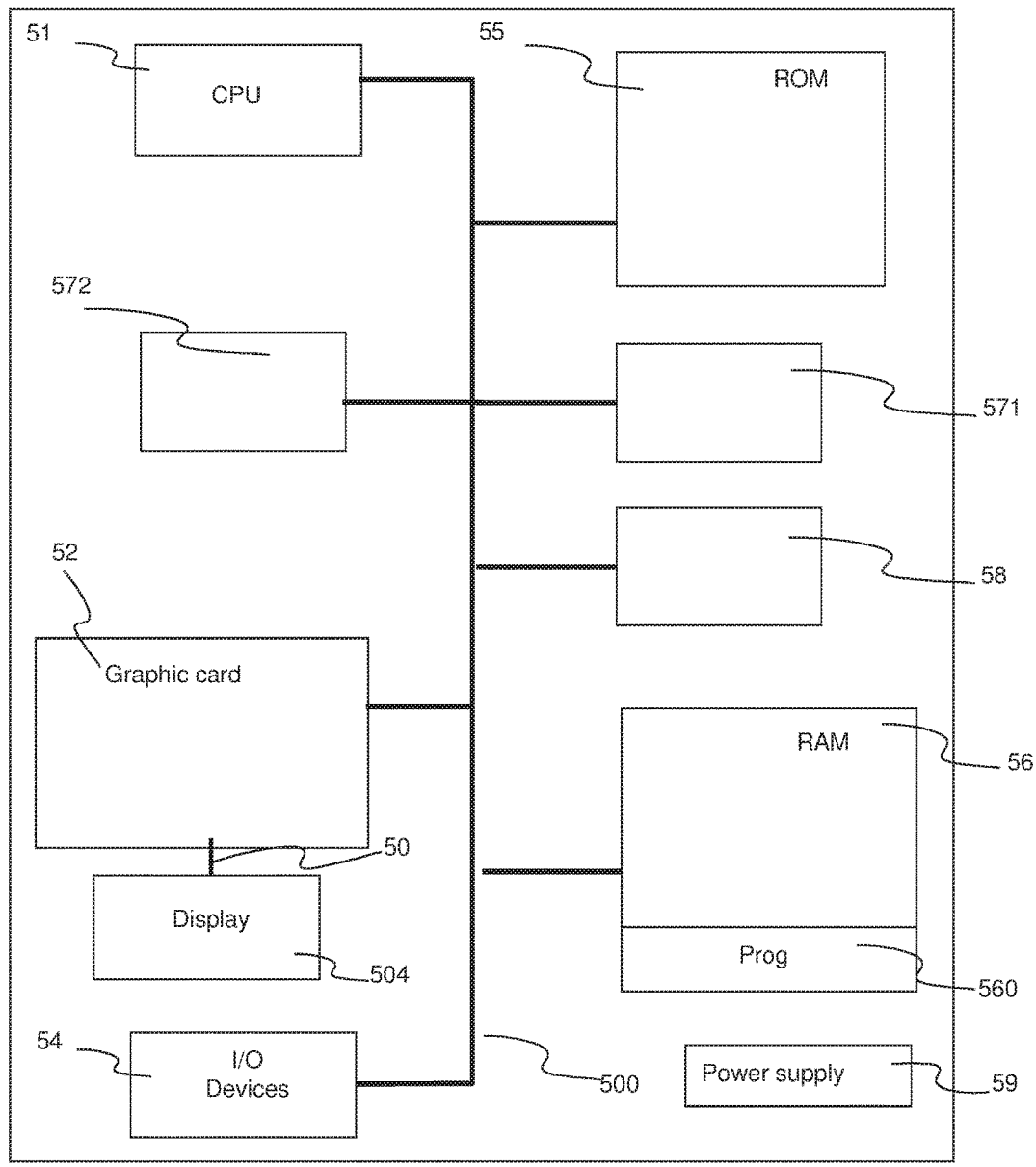
FIG. 5 illustrates the structure of the master device of the wireless communication system of FIG. 1.

FIG. 5 describes a master device, like a STB equipped with a dedicated dongle as the master device illustrated by FIG. 1.

In the particular embodiment of FIG. 5, the master device can include different devices, linked together via an USB protocol or via a data and address bus 500 which can also carry a timer signal. For instance, it can include a microprocessor 51 (or CPU), at least one Input/Output module 54, (like a tactile display, a switch, a led, a button, and so on), a ROM (or « Read Only Memory ») 55, a RAM (or « Random Access Memory ») 56, communication interfaces 571, 572 configured for the reception and/or transmission of data via a wireless connection, wired communication interfaces 58 (optional), a power supply 59. The master device can also comprise other wireless connections, like WI-FI® or Bluetooth® connections (optional).

In some embodiments, the master device can also include, or be connected to, a display module 504, for instance a screen or a TV set, directly connected to a graphics card 52 by a dedicated bus 50.

In the illustrated embodiment, the master device 120 can communicate with an audio renderer 140, 142, 144, 146, 150 thanks to a wireless interface.

Each of the mentioned memories can include at least one register, that is to say a memory zone of low capacity (a few binary data) or high capacity (with a capability of storage of a whole program or of all or part of data representative of data to be calculated or displayed).

When the master device is powered on, the microprocessor 51 loads program instructions 560 in a register of the RAM 56 and executes the program instructions.

According to a variant, the master device includes several microprocessors. According to another variant, the power supply 59 is external to the master device.

Figure 4A:
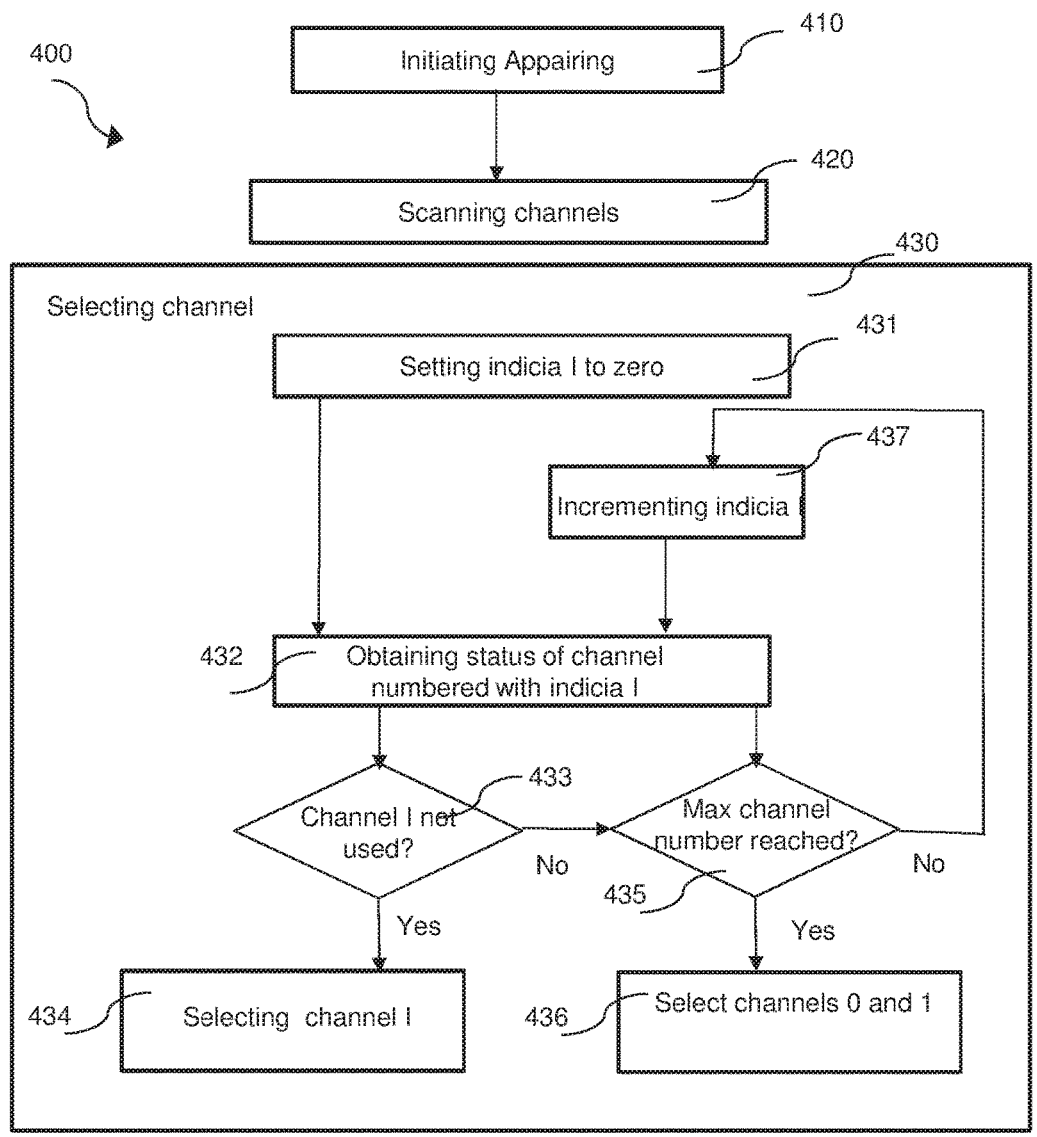
FIG. 4A illustrates the method of the present disclosure performed in one of the audio renderer of the wireless communication system of FIG. 1 working in a mono channel audio configuration mode.
Figure 4B:
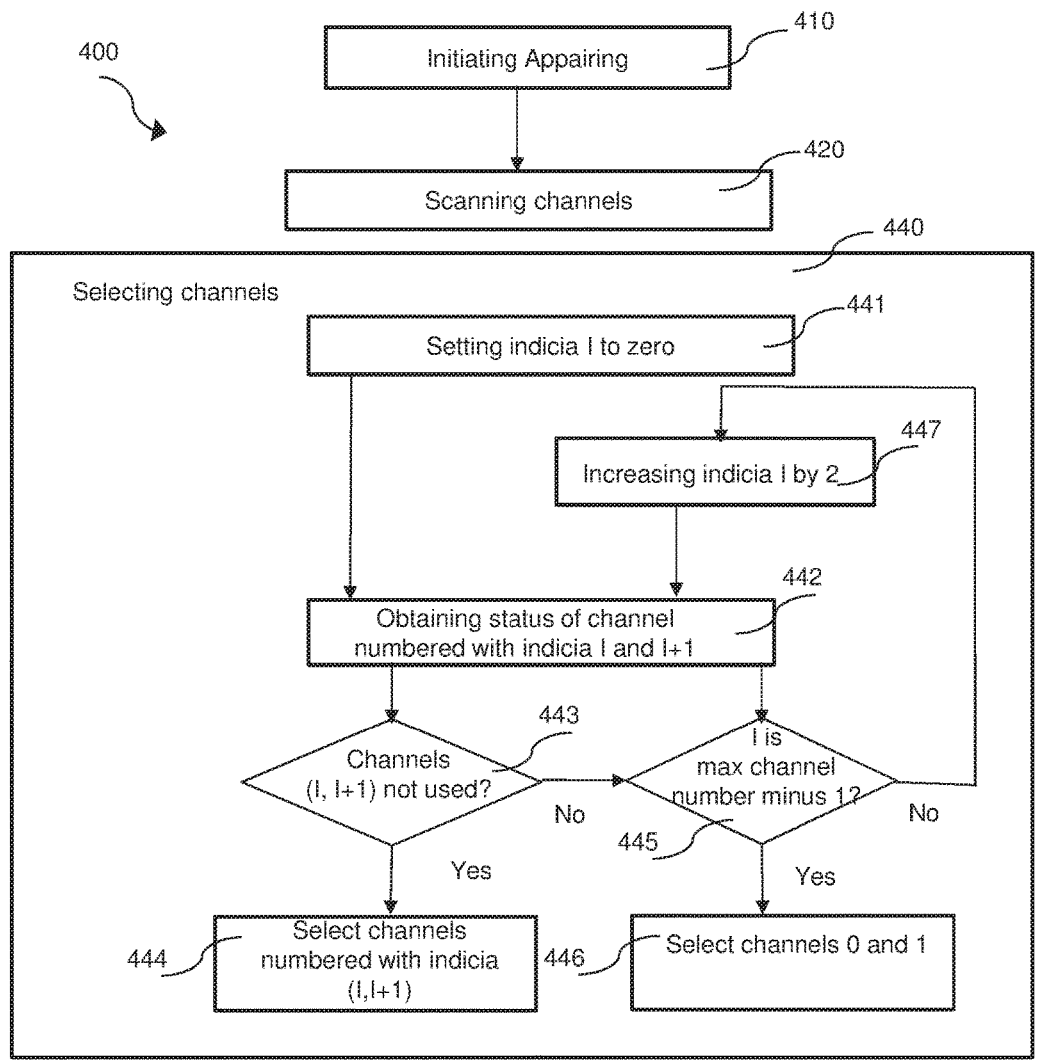
FIG. 4B illustrates the method of the present disclosure performed in one of the audio renderer of the wireless communication system of FIG. 1 working in a double channels (or stereo) audio configuration mode.

FIGS. 4A and 4B show a particular embodiment of the method 400 of the present disclosure, implemented in an audio renderer. For instance, it can be an audio renderer illustrated by FIG. 1, like a satellite speaker 140, 142, 144, 146 or a subwoofer 150.

According to the embodiment described by FIGS. 4A and 4B, the user of the system of FIG. 1 has already switched on his STB and moved each speaker of his system to its desire location. All the speakers are switched off. The user then starts powering on and pairing at least one audio renderer, or speaker, of his system with a master device, the renderers of the system being powered on and paired one after one (a first one being powered on and paired, a second one being then powered on and paired, . . . ). The order of powering on and pairing of the speakers with the master device (herein the dongle of the STB) can determine the channel (or channels) assigned to a speaker. Such an embodiment can permit to modify the rendering after an inverting of a location of two powered off speakers.

According to the illustrated embodiment, the channels output by the dongle can be numbered from 0 to n (n being the number of channels minus 1), with a determined order. For instance, in the detailed embodiment, the channels can be numbered from 0 to 3. Channel numbered 0 can be the front left audio channel. Channel numbered 1 can be the front right channel, channel numbered 2 can be the rear left channel. Channel numbered 3 can be the rear right channel.

According to the detailed embodiment of FIG. 4A or 4B, the method comprises initiating (at 410) the pairing of a speaker. The way this initiating is performed can vary upon embodiments. In the particular embodiment described herein, the initiating comprises pressing a pairing button. Depending upon the duration of the action made on the pairing button, the speaker can be configured in mono or in stereo consumption mode. According to the detailed embodiment illustrated by FIG. 4A, the audio consumption mode of the audio renderer is mono. According to the detailed embodiment illustrated by FIG. 4B, the audio consumption mode of the audio renderer is stereo.

The method further comprises scanning (at 420) the audio channels transmitted from the master device and selecting (at 430, 440) at least one channel according to the scanning result. The selecting can differ depending upon the audio consumption mode of the audio renderer.

The scanning can notably comprise:
  listening for an information published on the communication network by the master device comprising an identifier of the master device and a number of channels output;
  obtaining a message, from the master device, identifying the channels output by the master and, for each output channel, a selection state indicative of an existing selection of the channel by another audio rendering device (or in other words, indicative of an existing use of the channel).

In the embodiment described, where the STB can be equipped with a dongle like the dongle TI CC85xx developed by Texas Instrument®, the message (or scanning result) can comprise a variable (coded on 2 bytes for instance) which can describe the state (coded on 4 bits for instance) of all the audio channels input to the master device that can be wirelessly output by the master device. Another variable can indicate, for at least one of the audio channels, if a slave speaker has already selected this audio channel.

If the speaker has been configured in a mono audio consumption mode (by a user or because the mono mode is the default mode), the selecting (at 430) can comprise checking the result of the scanning channel after channel.

The selecting (at 430) can comprise setting (at 431) an indicia (I) to an initial value. In the described embodiment, where channels are assigned numbers from 0 to 3, the initial value can be 0. Of course, the initial value can differ depending on the numbering of the channels. From the scanning result, the method can comprise obtaining (at 432) the status of the channel (called herein after "current channel") being numbered by the current value of the indicia.

If the current channel is not used 433 then the method can comprise selecting (at 434) the current channel.

If the current channel is already used 433, the method can comprise testing (at 435) if the indicia has already reached the maximum number assigned to a channel. If not, the method can comprise incrementing (at 437) the indicia (the indicia I being assigned the value I+1) and iterating the determining, the test of availability and, optionally, the comparing with the maximum number of channels.

In the particular embodiment described, the same firmware can be implemented in a satellite speaker and in a subwoofer, with the subwoofer being the latest audio renderer being powering on and paired. In such an embodiment, if the current channel is already used 433 with the indicia having reached the maximum number of channels 435, then the audio renderer can be assumed to be a subwoofer or a satellite speaker located in another room (as all the channels are used) and the method can comprise forcing the device to work in a stereo audio consumption mode and selecting 436 two default channels, for instance the channels numbered herein 0 and 1 (and being the rear left and rear right channels).

As illustrated by FIG. 4B, if the speaker has been configured in a stereo audio consumption mode, the selecting (at 440) can comprise checking the result of the scanning by step of two channels.

The selecting (at 440) can comprise setting (at 441) an indicia (I) to an initial value. In the described embodiment, where channels can be signed numbers with value from 0 to 3, the initial value can be 0. Of course, the initial value can differ depending on the numbering of the channels.

From the scanning result, the method can comprise obtaining (at 442) the status of a channel (called herein "current channel") numbered with the current value of the indicia and the following value (I+1) of indicia.

If the current channel and the channel following this current channel are not used 443, the method can comprise selecting (at 444) those two channels.

If one of current channel or the channel following this current channel is not already used 443, the method can comprise testing 445 if the channel following the current channel is the channel being assigned the maximum number assigned to a channel (or in other words if the condition (I=Max Channel Number minus 1) is achieved). If not, the method can comprise incrementing 447 the indicia (the indicia I being assigned the value I+2) and iterating the determining, the test of availability and, optionally, the comparing with the maximum number of channels.

In the particular embodiment described, where the same firmware can be implemented in a satellite speaker and in a subwoofer, if the current channel or the channel following this current channel are not available or already used 443 with the indicia having reached 445 the maximum number of channels minus 1, then the audio renderer can be assumed to be a subwoofer and the method can comprise selecting (at 446) two default channels, for instance the channels numbered herein 0 and 1 (and being the rear left and rear right channels).

The method can further comprise memorizing the at least one selected channels, in order to keep the same channel when being powering on and or until the next pairing.

The present disclosure has been described in relation with channels numbered from 0 to a maximum number (like 3), with an indicia having an initial value "0" and varying by increasing values. Of course, in another embodiment, the indicia can be set to an initial value being the maximum number assigned to a channel, and varying by decreasing values.

The present disclosure has been described in relation with a particular protocol, adapted notably to products like the product TI CC85xx developed by Texas Instrument®. Of course, as it will be understandable for a person skilled in the art, the present disclosure may also been applied in a communication system using other network protocols, notably network protocols requiring a pairing between of the audio renderer and a "master" device.

As will be appreciated by one skilled in the art, aspects of the present principles can be embodied as a system, an audio acquiring and/or rendering device, a method, or a computer readable medium. Accordingly, aspects of the present disclosure can take the form of an hardware embodiment, a software embodiment (including firmware, resident software, micro-code, and so forth), or an embodiment combining software and hardware aspects that can all generally be referred to herein as a "circuit", module" or "system". Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage mediums to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it will be appreciated by those skilled in the art that the block diagrams presented herein represent conceptual views of illustrative system components and/or circuitry of some embodiments of the present principles. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

The invention claimed is:

1. An audio rendering and/or acquiring device belonging to a communication system comprising a master device, said audio rendering and/or acquiring device comprising at least one processor, the processor acting to configure said audio rendering and/or acquiring device to consume data from and/or to produce data to at least one first channel of a plurality of audio channels of said master device, said acting to configure comprising:
   obtaining from said master device, for at least one second audio channel of said plurality of audio channels, an information representative of whether said second audio channel is currently assigned to at least another audio rendering and/or acquiring device of said communication system, said obtaining being performed sequentially on channels of said plurality of audio channels according to a numbering of said audio channels until an information representative of a second audio channel being not currently assigned to another audio rendering and/or acquiring device is obtained or an information representative of all channels being currently assigned to at least another audio rendering and/or acquiring device of said communication system is obtained; and
   when an information representative of a second audio channel being not currently assigned to another audio rendering and/or acquiring device is obtained, the processor selects said at least one first audio channel as being said not currently assigned second channel.

2. The audio rendering and/or acquiring device of claim 1, wherein said channels of said plurality of audio channels are wireless audio channels.

3. The audio rendering and/or acquiring device of claim 1, wherein said obtaining and said selecting are performed during a pairing between said audio rendering and/or acquiring device and said master device.

4. The audio rendering and/or acquiring device of claim 1, wherein said audio rendering and/or acquiring device is configurable to use a variable number of audio channels.

5. An audio rendering and/or acquiring device belonging to a communication system comprising a master device, said audio rendering and/or acquiring device comprising at least one processor, the processor acting to configure said audio rendering and/or acquiring device to consume data from and/or to product data to at least two first channels of a plurality of audio channels of said master device, said configuring comprising:
   obtaining, from said master device, for at least one second audio channel of said plurality of audio channels, an information representative of whether said second audio channel is currently assigned to at least another audio rendering and/or acquiring device of said communication system, said obtaining being performed successively on channels of said plurality of audio channels according to a numbering of said audio channels until information representative of at least two successive second channels being not currently assigned to another audio rendering and/or acquiring device is obtained or an information representative of all channels being currently assigned to at least another audio rendering and/or acquiring device of said communication system is obtained; and
   when an information representative of at least two successive second channels being not currently assigned to another audio rendering and/or acquiring device is obtained, selecting said at least two first channels as being said at least two not currently assigned second successive audio channels.

6. The audio rendering and/or acquiring device of claim 5, wherein said channels of said plurality of audio channels are wireless audio channels.

7. The audio rendering and/or acquiring device of claim 5, wherein said obtaining and said selecting are performed during a pairing between said audio rendering and/or acquiring device and said master device.

8. The audio rendering and/or acquiring device of claim 5, wherein said audio rendering and/or acquiring device is configurable to use a variable number of audio channels.

9. A method, to be performed in an audio rendering and/or acquiring device belonging to a communication system comprising a master device, said method comprising:
   configuring said audio rendering and/or acquiring device to consume data from and/or to produce data to at least one first channel of a plurality of audio channels of said master device;
   obtaining from said master device, for at least one second audio channel of said plurality of audio channels, an information representative of whether said second audio channel is currently assigned to at least another audio rendering and/or acquiring device of said communication system, said obtaining being performed sequentially on channels of said plurality of audio channels according to a numbering of said audio channels until an information representative of a second audio channel being not currently assigned to another audio rendering and/or acquiring device is obtained or an information representative of all channels being currently assigned to at least another audio rendering and/or acquiring device of said communication system is obtained; and
   when an information representative of a second audio channel being not currently assigned to another audio rendering and/or acquiring device is obtained, the processor selects said at least one first audio channel as being said not currently assigned second channel.

* * * * *